G. W. VAN DUSEN.

Mechanical Musical Instrument.

No. 8,835. Reissued Aug. 5, 1879.

Witnesses
Fred Haynes
T P Lane

Inventor
George W. Van Dusen
by his Attorneys
Brown & Brown

THE NORRIS PETERS CO., PHOTO-LITHO., WASHINGTON, D. C.

UNITED STATES PATENT OFFICE.

GEORGE W. VAN DUSEN, OF BROOKLYN, E. D., NEW YORK, ASSIGNOR TO ELIAS P. NEEDHAM & SON.

IMPROVEMENT IN MECHANICAL MUSICAL INSTRUMENTS.

Specification forming part of Letters Patent No. 72,129, dated December 10, 1867; Reissue No. 8,835, dated August 5, 1879; application filed April 25, 1878.

*To all whom it may concern:*

Be it known that I, GEORGE W. VAN DUSEN, of Brooklyn, in the county of Kings and State of New York, have invented new and useful Improvements in Musical Instruments; and I do hereby declare that the following is a full, clear, and exact description of the invention, which will enable others skilled in the art to make and use the same, reference being had to the accompanying drawings, forming part of this specification.

The present invention relates to musical instruments wherein, by means of the passage of a perforated surface or surfaces, the notes of the instrument may be permitted to sound or be sounded in such order as may be desired to produce a given tune.

The invention consists in the combination of a motor for operating a sound-producing device, a valve for controlling the action of such motor, and a perforated strip or sheet for effecting the operation of said valve.

The invention also consists in various novel combinations of parts, hereinafter set forth.

Figure 1:
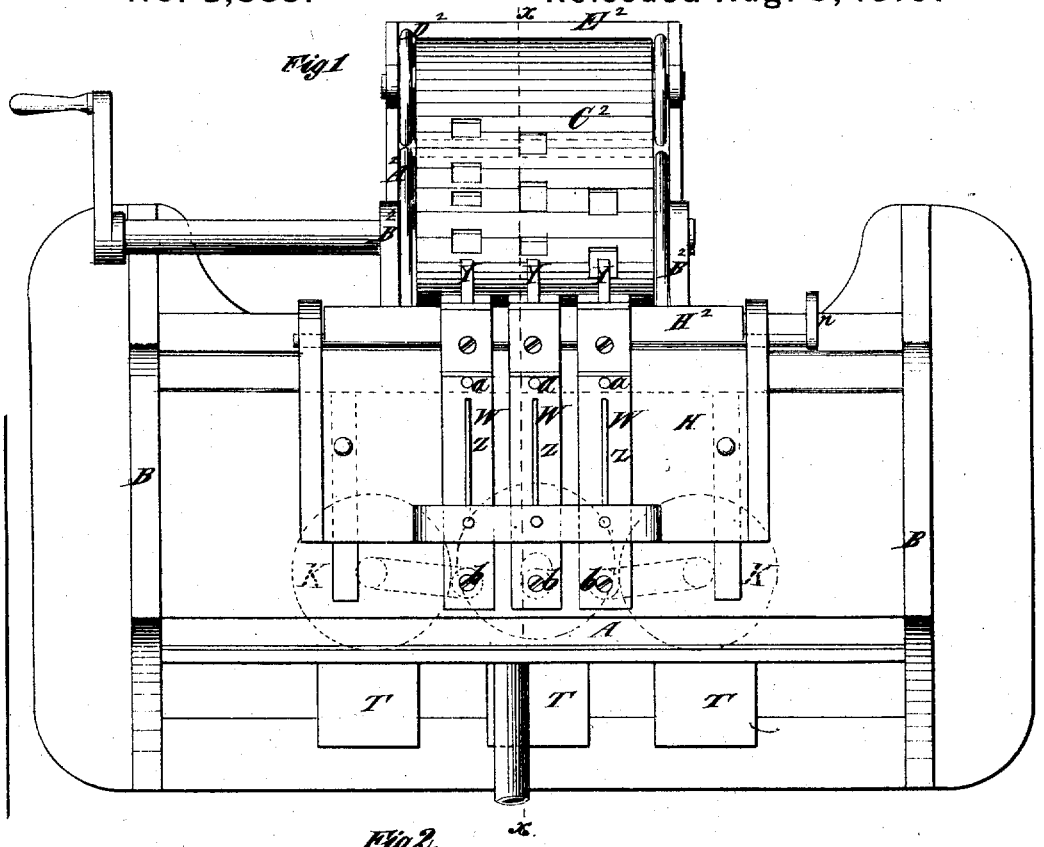
Figure 2:
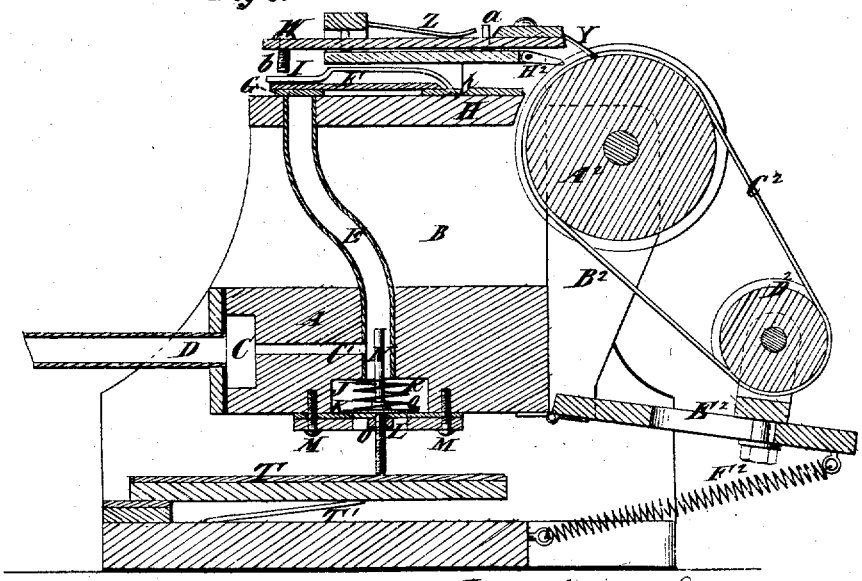

In the accompanying plate of drawings my improvements in musical instruments are illustrated, Figure 1 being a plan or top view of a portion of a musical instrument embodying the same; and Fig. 2, a vertical section taken in the plan of the line *x x*, Fig. 1.

Similar letters of reference indicate like parts.

A in the drawings designates an air or wind chest, supported at the ends by uprights B. C designates a passage in the wind-chest, represented as of a rectangular shape. At one side it is shown as provided with a pipe, D, which is to communicate with an apparatus for producing a suction within it. The other side communicates in the present instance by a conduit, C′, with an air duct or passage, shown as consisting of a tube or pipe, E, opening at its upper end to the external atmosphere, under control of a valve, F, shown as provided with a suitable facing, G, and connected at one end by a hinge, *h*, to the upper side of a rail, H, so that the lifting and dropping of it will effect the opening and closing of the end of the said tube or pipe E, and control the ingress of air into it.

A bent spring, I, attached to the rail H, serves to lift this valve when it is not otherwise acted upon; and a finger or lever, W, pivoted on an upright pin or fulcrum, *a*, extending from a rail supported over the valve F, serves to preclude said valve from lifting, save at the proper time. As represented, this finger or lever is so constituted and pivoted that its arm which acts on the said valve F is much longer than the other; hence any motion imparted to the latter is greatly multiplied in the former. The arm which acts on the valve is provided with an adjustable piece—for instance, a screw, *b*—for acting on said valve.

A spring, Z, extending from a rail arranged over this finger or lever and impinging on it, tends to keep it in its normal position. A description of the means for operating this finger will be deferred for the present.

J designates a chamber in communication with the wind-chest and with the tube or pipe E. K is a flexible diaphragm or plate secured to the outside of the wind-chest, in this instance by a ring, L, fitting outside its edge portion, and secured by screws M or other proper fastening devices. N designates a stem or pin, actuated by, and in the present instance secured to, said diaphragm K, so as to move with the same—in this example by means of a screw-nut, O, and a shoulder or disk, Q, between which the diaphragm is tightly clamped. R designates a spiral spring applied to the diaphragm K, and shown as located within the chamber J and surrounding the stem N. It aids in returning the diaphragm to its place after its operation.

It will be seen that thus I form a pneumatic motor comprising a flexible portion, and capable of being operated under control of the valve F.

T designates a key or lever, arranged or hung to move in a vertical plane below the wind-chest. It is impelled upward by a spring, T′, when not otherwise actuated; but at certain times it is impelled downward through the pneumatic motor just described. It is intended to be connected with any suitable arrangement of mechanical devices—as, for instance, such as are now in use for producing or causing to be produced musical notes or sounds, whether by means of reeds or of strings or otherwise.

I will here remark that the foregoing apparatus is to be reproduced, save as regards the wind-chest, for the different musical notes or sounds to be produced in the musical instrument.

I will now describe the means for operating the fingers or levers W, whereby the valves controlling the pneumatic motors are controlled. These fingers or levers are severally provided at their outer ends with downwardly-extending metallic tail-pieces or points Y, which impinge upon a perforated strip or sheet, $C^2$, of paper or other flexible material. In the present example of my invention this perforated strip $C^2$ is made in the form of an endless belt or band, supported by and running around rollers $A^2$ $D^2$. The roller $A^2$ is arranged to turn in suitable bearings in the uprights $B^2$. This roller is in proximity to the tail-pieces Y of the fingers or levers W, just below the same, and in position for such finger-pieces to rest on the said strip $C^2$ as it passes around said roller. This strip $C^2$ also passes around a roller or drum, $D^2$, shown as hung in bearings in an adjustable frame, $E^2$, pivoted in this instance to the side of the wind-chest A, so as to be free to swing up or down, it being impelled downward by a spring, $F^2$, applied thereto in any suitable manner.

The roller $D^2$ thus serves to hold the paper strip at a sufficient tension to produce the desired amount of friction to enable motion to be imparted to it from the rotation of one of the rollers.

The roller $A^2$ is represented as the driving-roller, and as furnished with a crank, whereby motion may be imparted to it.

$H^2$ designates a rail arranged under the tail-pieces Y of the fingers or levers W, and pivoted to its supports, so that by turning or swinging it in the proper direction the said tail-pieces and fingers or levers can be raised or adjusted entirely out of contact with the perforated strip or sheet, to facilitate the operation of removing it and the replacing it with another.

The rollers $A^2$ and $D^2$ are also so hung as to be of easy removal for inserting a new or different perforated strip or sheet, according to the tune or melody desired to be produced.

Having thus described the construction and arrangement of parts according to the present improvements in musical instruments, I will now proceed to explain the manner in which the same operate.

The perforated strip $C^2$ being made to pass around the rollers $A^2$ and $D^2$, by means of any suitable driving mechanism, and also a suction produced in the wind-chest A, by means of any suitable bellows or other air apparatus connected with the wind-chest at D, the suction in the wind-chest causes the diaphragms K of the pneumatic motors, with their stems N, to be drawn inward, raising the latter from or removing their pressure from the keys T.

As one of the perforations in the strip $C^2$ comes under a tail-piece, Y, of one of the fingers or levers W, the finger or lever which carries such tail-piece Y then moves sufficiently to raise the stud *b* from the valve F, which then, by the action of the spring I, is lifted from the tube E, thereby permitting the entrance of air, which, rushing through it, presses down the diaphragm K, and, consequently, through its stem N, causes the key T upon which it impinges to be operated, and thus actuates the mechanism for producing a sound or note, the length of which depends upon the length of the perforation in the strip or sheet; but when the perforation has passed by the tail-piece Y of the referred-to finger or lever W, it raises the adjacent end of said finger or lever W, to which it is fastened. Thus its other end closes the valve F and stops the sound, as is obvious. From this it will be seen that the perforated strip or sheet $C^2$ controls the operation of the aforesaid motor.

The diaphragm K of the pneumatic motor may be arranged to act directly upon the sound-producing mechanism, in lieu of through a key, as above described; and I therefore wish it to be distinctly understood that I do not intend to limit myself to any one arrangement of parts between the said pneumatic motor and the sound-producers, as this invention has no reference to such parts. Nor do I intend to limit myself to any particular arrangement or form of perforations, or their equivalents, in the strip or sheet $C^2$, as such perforations, &c., will depend upon the melody or tune to be executed or performed in the musical instrument.

It may be here observed that, owing to my arrangement of parts between the plane of movement of the perforated sheet and the wind-chest A or its passage, and the arrangement of the diaphragm K, it is plainly apparent that with but a slight movement to the tail-piece Y of any of the fingers or levers W a proper action can be obtained upon the diaphragm-stem N, for actuating the sound-producing mechanism, whereby comparatively thin paper or other suitable sheet material can be used without the least danger of being injured or damaged, either at the edges to its perforations or upon its plain surface.

I claim as new and desire to secure by Letters Patent—

1. In a musical instrument, the combination of a motor for operating a sound-producing device, a valve for controlling the action of said motor, and a perforated strip or sheet for effecting the operation of said valve.

2. In a musical instrument, the combination of a pneumatic motor for operating a sound-producing device, a valve for controlling the action of said motor, and perforated strip or sheet for effecting the operation of said valve.

3. In a musical instrument, the combination of a motor for operating a sound-producing device, a valve for controlling the action of said motor, and an endless perforated strip or sheet for effecting the operation of said valve.

4. In a musical instrument, the combination of a chamber fitted with a flexible diaphragm, means for exhausting air from said chamber, a valve for controlling the ingress of air into such chamber, and a perforated strip for actuating said valve.

5. In a musical instrument, the combination of a sound-producing device, a finger or lever for controlling its operation, a perforated strip or sheet for actuating said finger or lever, and a device for shifting said finger or lever out of contact with said strip or sheet.

6. In a musical instrument, the combination of a sound-producing device, a finger or lever for controlling its operation, provided at one end with an adjustable piece, and at the other with a tail-piece, forming an extension thereof, and a perforated strip or sheet for actuating said finger or lever through the tail-piece aforesaid.

7. In a musical instrument, the combination of a sound-producing device, a motor for operating the same, a valve for controlling said motor, a finger or lever for controlling the operation of said valve, provided at one end with an adjustable piece for acting on said valve, and a perforated strip or sheet for actuating said finger or lever.

8. In a musical instrument, the combination of the wind-chest A, chamber J, diaphragm K, the stem N, the spring R, and the valve F.

9. In a musical instrument, the combination of an air duct or passage, a valve for controlling the passage of air into the same, a lever for controlling the operation of said valve, and a perforated strip or sheet for controlling the operation of said lever.

10. In a musical instrument, the combination, with a perforated strip or sheet for controlling the operation of a sound-producing device, of two rollers for supporting it, one of said rollers being adjustable relatively to the other, for the purpose specified.

11. The combination and arrangement of lever W, with tail-piece Y at one end and adjustable piece *b* at the other, valve F, and air tube or pipe E, closed by a flexible diaphragm, K, substantially as herein described, and for the purpose of producing, by means of air, an action upon any suitable sound-producing mechanism through the movement of a perforated strip or sheet.

12. The combination, with a pneumatic motor comprising a flexible portion, of a perforated strip or sheet controlling the operation of the same, and a sound-producing device operated under control of said motor.

13. The combination, with a pneumatic motor comprising a flexible portion, of a perforated strip or sheet controlling the operation of the same, and a lever actuated by said motor.

14. The combination of a pneumatic motor, a perforated strip or sheet controlling the operation of the same, a lever actuated by said motor in one direction, and means for causing the said lever to resume its normal position.

GEO. W. VAN DUSEN.

Witnesses:
E. P. JESSUP,
HENRY I. BROWN.